United States Patent [19]

Diaz et al.

[11] Patent Number: 4,745,601
[45] Date of Patent: May 17, 1988

[54] DIGITAL SERVICE UNIT WITH SECONDARY CHANNEL DIAGNOSTICS

[75] Inventors: Jose R. Diaz, Sunrise; Norman J. Donaghue, Jr., Plantation, both of Fla.

[73] Assignee: Racal Data Communications Inc., Sunrise, Fla.

[21] Appl. No.: 790,687

[22] Filed: Oct. 23, 1985

[51] Int. Cl.$^4$ .............................................. H04J 3/12
[52] U.S. Cl. .................................. 370/110.1; 370/84; 370/112
[58] Field of Search ....................... 370/110.1, 84, 100, 370/110.4, 112

[56] References Cited

U.S. PATENT DOCUMENTS

| | | |
|---|---|---|
| 3,787,613 | 1/1974 | Farmer et al. |
| 4,190,741 | 2/1980 | Cointot . |
| 4,385,384 | 5/1983 | Rosbury et al. |
| 4,408,325 | 10/1983 | Grover . |
| 4,498,186 | 2/1985 | Hwang et al. |
| 4,520,480 | 5/1985 | Kawai . |

OTHER PUBLICATIONS

"Local Distribution System" by Bender, Kneuer and Lawless, *The Bell System Technical Journal*, vol. 54, No. 5, May–Jun. 1975, pp. 919–942.
"Network Management Systems: the Next Generation" by Lawrence R. Pigeon reprinted from Jul. 1985 edition of *Telecommunications*.
"Introduction to Communications Management Series", sales brochure by Racal-Milgo, 1982.
AT&T Publication No. 41021, "Digital Data System Channel Interface Specification", Mar. 1973; 41021A addendum.
Bell System Technical Reference Publication Number 41450 entitled "Digital Data System Data Service Unit Interface Specification", Nov. 1981.
AT&T Communications Publication No. 62120 entitled "Digital Data System with Secondary Channel", Apr. 1984.
Codex TM Fall 1985 Direct Order Catalog, pp. 30–32 and 36–38.
TeleProcessing Products, Inc., product profile.
Black Box Catalog of Data Communications and Computer Devices, Jul. 1985.

*Primary Examiner*—Douglas W. Olms
*Assistant Examiner*—Wellington Chin
*Attorney, Agent, or Firm*—Jerry A. Miller

[57] ABSTRACT

In a method and apparatus for transmitting data over either a DDS-I (74) or DDS-II (DDS-SC) network (34), a primary and secondary channel are accommodated preferably for providing both primary data capability and diagnostics for the network. Primary and secondary channel data are multiplexed with control information in a standard DDS-SC frame. The system timing circuitry is locked to the DDS data rate and means for providing encoding and decoding of bipolar violations is provided so that the digital service unit (DSU) is compatible with both types of digital data service. At power-up, a microcomputer (102) reads the DSU clock frequency and the voltage offset of operational amplifiers and provides adjustment through digital to analog converters (210,294).

18 Claims, 6 Drawing Sheets

| D1 | D2 | D3 | D4 | D5 | D6 | F | S/C |
|----|----|----|----|----|----|---|-----|

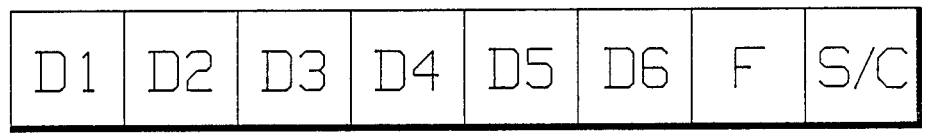
Fig. 1
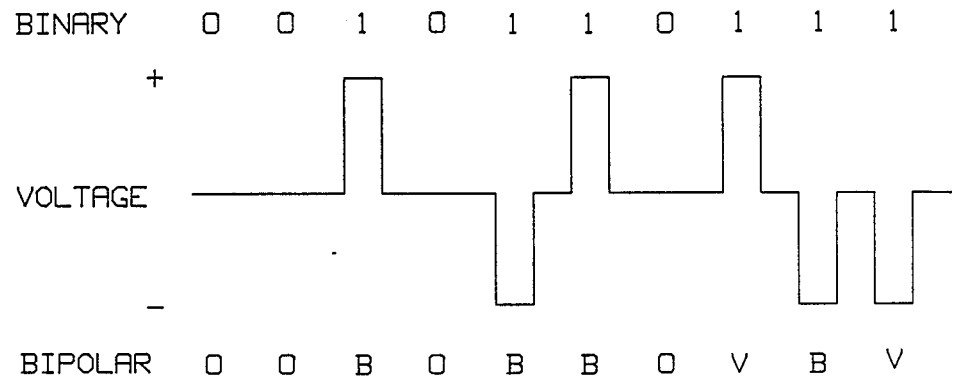
Fig. 2
Fig. 9
| DDS-I | | |
|---|---|---|
| BIT RATE | PRIMARY RATE | SECONDARY RATE |
| 9.6K | 7.2K | 400 |
| 4.8K | 3.6K | 200 |
| 2.4K | 1.8K | 100 |
Fig. 8
| DDS-SC | | |
|---|---|---|
| BIT RATE | PRIMARY RATE | SECONDARY RATE |
| 12.8K | 9.6K | 533 1/3 |
| 6.4K | 4.8K | 266 1/3 |
| 3.2K | 2.4K | 133 1/3 |

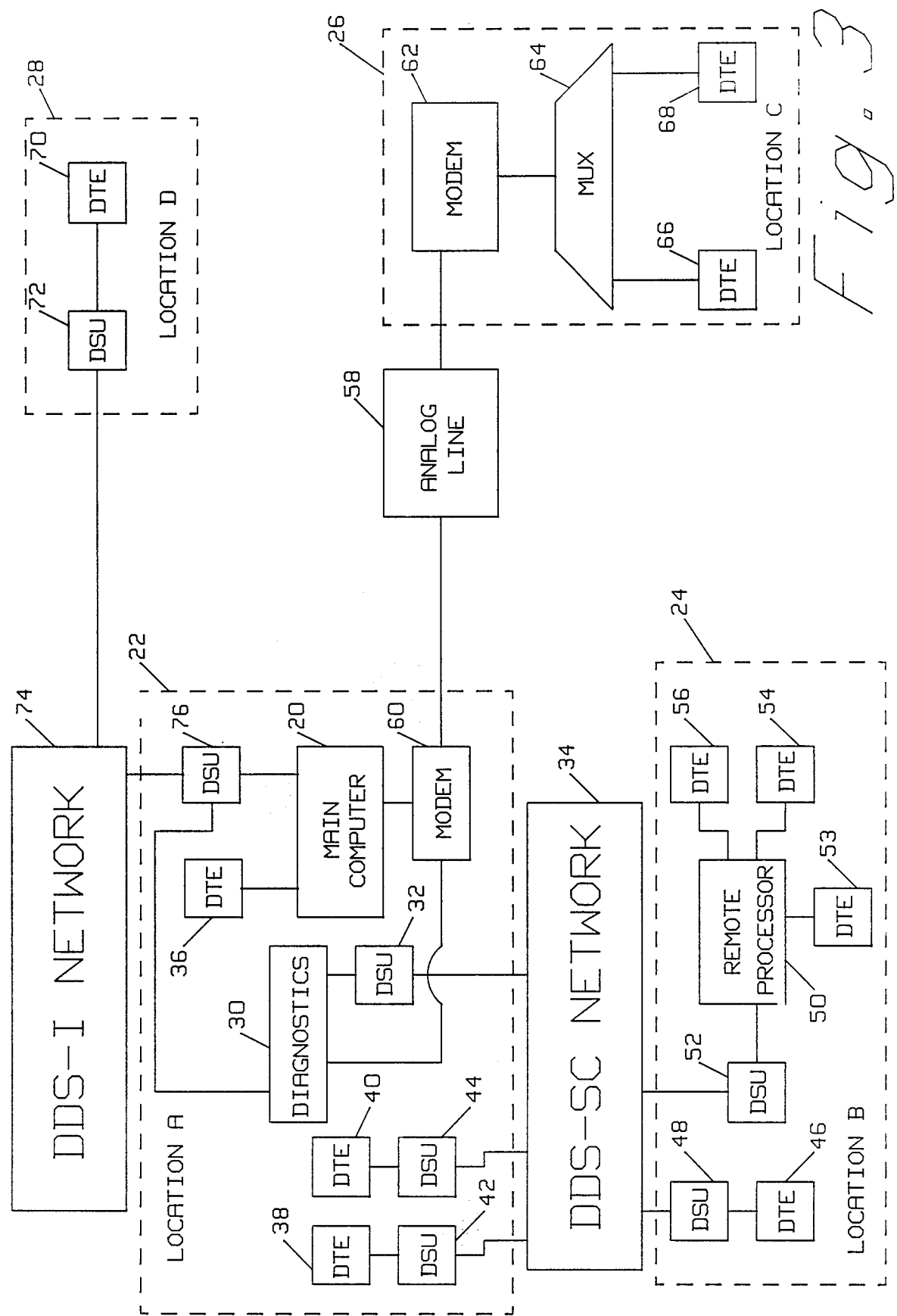

DIGITAL SERVICE UNIT WITH SECONDARY CHANNEL DIAGNOSTICS

CROSS REFERENCE TO RELATED DOCUMENTS

The following documents may be helpful as background information useful in understanding the present invention. U.S. Pat. No. 4,385,384 to Rosbury et al. and assigned to Racal Data Communications Inc., the assignee of the present invention, relates to a modern diagnostic and control system useful in providing secondary channel diagnostics for controlling the operation of modems. U.S. Pat. No. 3,787,613 to Farmer, et al. relates to a pulse transmission system utilizing pulses of alternating polarity and it described the use of bipolar violations as a technique for encoding data. Bell System publication Nos. 41021 and 41021A entitled "Digital Data System Channel Interface Specifications" defines the channel specifications for the Digital Data System, commonly known as Dataphone ® Digital Service provided by Americal Telephone and Telegraph Company. Bell System Publication No. 41450 entitled "Digital Data System Data Service Unit Interface Specification" describes the specification for Digital Service Units to be used on the Dataphone ® Digital Service. AT&T Communications Publication No. 62120 entitled "Digital Data System with Secondary Channel" relates to a preliminary specification for a new digital data service also using the trademark Dataphone Digital Service and providing capability for secondary channel. Bell System Publication No. 62310 entitled "Digital Data System Channel Interface Specification" also relates to specifications for the Dataphone Digital Service with Secondary Channel. Each of these documents is incorporated by reference as though disclosed fully herein.

BACKGROUND

1. Field of the Invention

This invention relates generally to the field of Digital Service Units (DSU) for use in conjunction with Digital Data Systems (DDS) such as the Dataphone ® Digital Service provided by the American Telephone and Telegraph Company. More particularly, this invention relates to a Digital Service Unit having secondary channel noninterruptive diagnostics capability and which is compatible with both Digital Data Systems. For purposes of this document, the original Digital Data System will be referred to as DDS-I. The newly proposed Digital Data System having secondary channel capability will be referred to as either DDS-II or DDS-SC. The term DDS will be used as a generic to both types of Digital Data Systems. (Note: As of this writing, DDS-II is a proposed system which is not yet available commercially.) Also, the present DSU should be understood to include a Channel Service Unit (CSU) in the preferred embodiment and is referred to frequently in the literature as a DSU/CSU.

2. Background of the Invention

It is desirable to provide secondary channel capability to the digital data system in order to provide noninterruptive diagnostics capability to reduce down time in the system. Such a need has been recognized by the Americal Telephone and Telegraph Company which has in response proposed a new Digital Data System having inherent secondary channel capability. This proposed system is referred to as DDS-II or DDS-SC.

The proposed network utilizes an eight bit frame format for data transmitted over the system between subrate DSUs (9 bits for 56 KBPS). Synchronous data is transmitted in a frame format shown in FIG. 1 in which the first six bits (seven for 56 KBPS) (D) are data bits. The seventh bit (F) is used as a framing bit and contains the repeated pattern 101100. The final bit (S/C) is shared between secondary channel use and control functions. This S/C bit is used to indicate that the D bits are data or control information. This final bit is capable of use is providing secondary channel information. When used as a control bit it provides an indication that the data bits are either control or primary channel bits. As with the standard DDS-I service, alternate mark inversion (AMI) encoding is utilized so that the data is bipolar in nature. A thorough description of the proposed DDS-SC system may be found in the references cited above.

The existing DDS system, i.e., DDS-I, imposes no frame format on the synchronous data transmitted over the system. Alternate mark inversion (AMI) is also used in the DDS-I system. In alternate mark inversion, pulses of alternating polarity are used to represent binary ones. Binary zeros are represented by a zero voltage level. In both systems, AMI is used in order to reduce the bandwidth requirements of the transmission lines as well as to assure a DC voltage level of approximately zero volts on the average across the transmission lines.

FIG. 2 shows an example AMI encoded pulse train as might typically be encountered in a DDS-I circuit. This figure shows that either a positive or negative pulse is interpreted as a binary 1 while zero volts is interpreted as a binary 0. FIG. 2 also illustrates the concept of bipolar violations in that the right-most pair of pulses are adjacent and have the same polarity. Similarly, the middle pair of pulses constitute a bipolar violation in that they also have the same polarity. This scheme is utilized to encode control signals in DDS-I networks in a manner well known in the art.

It is clear that diagnostics are desirable in a network using the Digital Data System. However, diagnostics capabilities have heretofore been available for DDS-I circuits only in the form of interruptive diagnostics where the system is incapable of normal data traffic while diagnostic activities are carried out, or by utilizing a separate statistical or time division multiplexer to provide a secondary channel. In order to provide noninterruptive diagnostics, a direct substitution of DDS-SC circuits is proposed but may not be a solution which is appropriate for all users. The cost of such service has yet to be established and it is therefore not clear whether the DDS-II service will be more economical than DDS-I or analog telepone lines for that matter. It is also not clear, in light of the divestiture of AT&T that DDS-II will be available universally throughout the continental United States as well as foreign countries. There is also no present system for utilizing DDS-II and DDS-I in the same data communication network while allowing retention of noninterruptive diagnostic capability throughout the entire network. In order to fully serve the data communication needs of the public, network transparent diagnostics is clearly desirable. It is also clearly desirable to provide a mechanism for providing DDS-I with noninterruptive diagnostics capability so that diagnostics may be used in areas which may not have DDS-SC service. The present invention addresses these needs in a single DSU thus reducing the overall cost of universal DDS compatibility while providing Secondary Channel capability.

It should also be noted that some users may be reluctant to purchase DDS-II equipment prior to the availability a DDS-II service. It is therefore desirable to provide a digital service unit which is capable of use with either DDS-I or DDS-II and which may provide immediate diagnostics capability regardless of the network. The present invention allows the DDS user to purchase diagnostic capable equipment for use on DDS-I networks and allows for easy upgrades to DDS-II in the future if available.

Other problems are also addressed with the present invention. For example, the present invention also provides a method and apparatus for correction for DC offset due to parts variation in operational amplifiers used in the Digital Service Unit as well as a technique for stabilizing the reference frequency of a voltage controlled oscillator used to recover clock information which is critical to the operation of synchronous data systems such as the digital data system. These and other problems associated with the establishment of a new DDS system are addressed by the present invention.

SUMMARY OF THE INVENTION

It is an object of the present invention to provide an improved subrate digital service unit.

It is another object of the present invention to provide a digital service unit with the ability to interface with either DDS-I or DDS-II and provide noninterruptive diagnostics.

It is another object of the present invention to provide a digital service unit capable of secondary channel in a DDS-I system.

It is another object of the present invention to provide an improved digital service unit with microprocessor controlled clock frequency adjustment.

It is a further object of the present invention to provide a digital service unit which may be used with DDS-I service to provide secondary channel diagnostics and which may be upgraded to use on a DDS-II circuit by selection from the control panel.

It is yet a further object of the present invention to provide a circuit arrangement for adjusting the offset of an operational amplifier.

These and other objects of the invention will become apparent to those skilled in the art upon consideration of the following description of the present invention.

In one embodiment of the present invention a circuit arrangement transmits primary and secondary channel data on a DDS-I network or a DDS-SC network and includes a primary input circuit for receiving primary channel data and a secondary input for receiving secondary channel data. A control circuit generates first and second control signals and a multiplexer multiplexes the first control signal the primary channel data and the secondary channel data to form an AMI data signal. A determining circuit determines which type of DDS network is to receive the multiplexed data. Violation encoding is imposed on the AMI data signal with the bipolar violations representing the second control signal when the AMI data signal is transmitted on a DDS-I network.

In another embodiment of the present invention an apparatus for conditioning DDS-SC frame formatted data for tranmission over standard DDS-1 network includes a circuit for adjusting the bit rate of the frame formatted data to correspond with the bit rate of the standard DDS-I network. Bipolar violations are encoded in the data to represent network control codes and the adjusted data is transmitted over the DDS-I network.

According to another embodiment of the present invention, a method of receiving DDS-SC frame encoded data over a standard DDS-I network, includes the steps of receiving DDS-SC frame encoded data at a bit rate corresponding to the bit rate of said standard DDS-I network and decoding bipolar violation encoded signals representing idle channel, zero suppression and out of service.

According to another embodiment of the present invention, a method of adjusting the frequency of a voltage controlled oscillator to a predetermined range includes the steps of measuring the frequency of oscillation of the voltage controlled oscillator by counting the number of oscillations of the voltage controlled oscillator with a computer; changing the output of a digital to analog converter by applying a binary number to the input of the digital to analog converter with the computer; and adjusting the control voltage of the voltage controlled oscillator with the digital to analog converter.

According to another embodiment of the present invention, a method of adjusting the offset of an operational amplifier includes the steps of measuring the offset of the operational amplifier by comparing the offset with ground; applying a binary number to the input of a digital to analog converter; and applying an offset adjustment to the operational amplifier with the output of the digital to analog converter.

The features of the invention believed to be novel are set forth with particularlity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

FIG. 1 is a diagram of the frame format for substrate DDS-SC data.

FIG. 2 illustrates an alternate marak inversion signal including bipolar violatios.

FIG. 3 shows a data communication network incorporating DDS-I, DDS-SC and analog lines in a single network which is capable of diagnostics.

FIG. 8 shows a table of data rates for DDS-SC.

FIG. 9 shows a table of data rates for DDS-I.

DETAILED DESCRIPTION OF THE INVENTION

Figure 4:
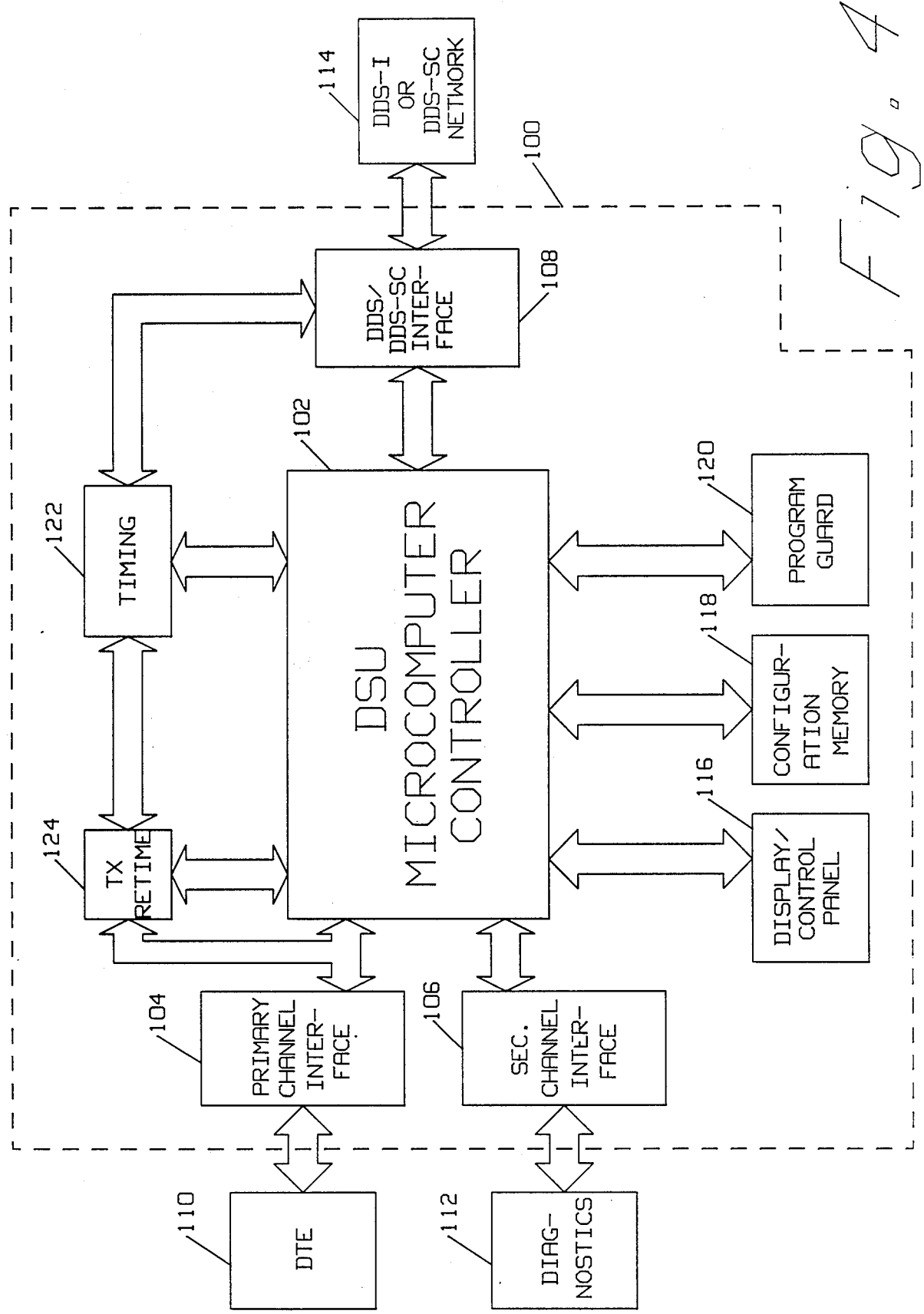
FIG. 4 is a block diagram of the digital service unit of the present invention.

The basic function of the present digital service unit is to take primary channel data from the data terminal equipment (DTE) or similar device and take secondary channel daata preferably from a diagnostics system such as the commercially available Racal Milgo CMS 185 or CMS 2000 series Diagnostics Controller. The secondary channel data is delivered to the internal diagnostics sections of the DSU and then combined with the primary channel data to form a formatted data stream. This formatted digital data is then transmitted synchronously through the DDS network. In order to provide secondary channel capability in the present DSU, the data rate at the DSU is selected from the control panel to whatever type of DDS network the DSU is connected to and the frame format of DDS-SC is utilized in both DDS-I or DDS-II. In addition, the DSU also receives and disassembles this structured data stream from the digital data service and passes primary channel data to the DTE and secondary channel data to the internal and external diagnostics equipment. While the present invention is described primarily in terms of an example embodiment of a substrate DSU, those skilled in the art will readily appreciate that the 56KBPS version of the present DSU may be provided using the same general principals and teachings of the present example. The modifications required to implement the 56KBPS embodiments will be evident to and within the capability of those skilled in the art.

Turning now to FIG. 3 an exemplary computer data communications system is shown. Of course, the system shown is by no means limiting as an infinite number of computer network systems are possible utilizing the present digital service unit. This exemplary network is merely intended to show some of the many ways that the present digital service unit can be utilized. Each of the DSUs represented in FIG. 3 may be identical.

In such a system it is typically the case that a main computer 20 is located in a particular geographic location represented by the equipment enclosed in broken lines 22 and generally designated location A. It is desirable to provide access to the main computer 20 to remote locations B, C and D designated 24, 26 and 28 respectively. A typical example of such a system might be a bank having a main computer at location A along with possibly a number of terminals for use by tellers and/or banking machines at location A. Branch offices of the bank or teller machines may be located at locations B, C and D, each of which require various degrees of access to the main computer 20. In this example, a main computer 20 and a diagnostics controller 30 are coupled to a digital service unit 32. Digital Service Unit 32 is in turn coupled to the DDS-SC network designated 34. Main computer 20 is also coupled to DTE 36 directly. DTE 38 and DTE 40 are connected to the DDS-SC network 34 via DSUs 42 and 44 respectively. Thus, DTE 38, for example, can obtain access to main computer 20 via DSU 42, DDS-SC network 34 and DSU 32. DTE 40 may similarly communicate with main computer 20 over the DDS-SC network.

In a similar manner, a DTE 46 located in a remote location B is coupled to a DSU 48 which is used to access DDS-SC network 34. A remote processor 50 may also communicate with main computer 20 via the DDS-SC network 34 by coupling to the network through DSU 52. Remote processor 50 may represent a so called "front end processor" and may be coupled directly to data terminal equipment such as 53, 54 and 56.

Location C represents a geographic area which is not accessible via the digital data service network. Communications with this location can be accomplished via a leased analog line 58 (or a dial up line) and modems 60 and 62. Modems 60 and 62 are preferably diagnostics capable such as the commercially available Racal Milgo OMNIMODE TM Series Modems. Modem 60 is also coupled to diagnostics controller 30. Modem 62 may include a multiplexer 64 as part of the modem or as a separate unit to enable two or more DTEs such as 66 and 68 to utilize the same analog line. Of course it is desirable to use the DDS network rather than analog telephone lines in most situations, since digital lines have many advantages over conventional analog lines. For example, the equipment used for interfacing DDS networks is substantially less expensive than high speed modems and very low error rates are possible with digital lines. It is also possible to achieve substantially higher data rates with digital lines. For example, in the DDS-SC network it is possible to obtain lines at 56 KBPS (point to point).

Location D represents an area requiring access to main computer 20 which does not have access to the DDS-II network but does access DDS-I. In location D, DTE 70 is coupled to a digital service unit 72 which accesses the DDS-I network designated 74. DSU 76 which is coupled to diagnostics controller 30 is utilized to couple main computer 20 to the DDS-I network 74 so that communications as well as diagnostics capability according the the present invention is obtained at location D. It should be pointed out that the present invention does not provide noninterruptive diagnostic capability for multipoint configurations of DDS-I. Only point-to-point diagnostics are possible due to limitations not in the present DSU but rather in the telephone company's multipoint junction units (MJU). With DDS-SC however, multipoint circuits will presumably be possible while retaining full diaagnostics capability.

Although not shown in FIG. 3, the present invention fully contemplates second tier diagnostic equipment. Those skilled in the art will recognize that interconnection of a second tier of diagnostics at a front end processor or other suitable location is analogous to a similar connection in a modem based system using analog lines rather than the DSU and digital line based networks of the present invention.

Turning now to FIG. 4, a block diagram of a subrate digital service unit according the present invention is shown and designated generally as 100. One skilled in the art will readily appreciate that a 56 KBPS DSU may be provided by suitable modification to the present subrate DSU. In the preferred embodiment, the DSU is built around a microcomputer based controller 102. Controller 102 preferably includes a pair of microprocessors as will be explained in more detail in conjunction with FIG. 5. Controller 102 communicates with a primary channel interface 104 and secondary channel interface 106 as well as a DDS interface 108. A DTE device 110 is coupled to primary channel interface 104 and a diagnostics controller 112 is coupled to secondary channel interface 106. A DDS network 114 is coupled to DDS interface 108. In the preferred embodiment DSU 100 also includes a display/control panel 116, a configuration memory 118 and a program guard circuit 120 which are also coupled to controller 102. In addition, timing circuit 122 and transmitter retiming circuit 124 are also coupled to the DSU controller 102.

In the preferred embodiment controller 102 includes two electronics industry standard 8051 or 8052 microprocessors such as those manufactured by INTEL ® which operate in unison to make up the brains of the digital service unit controller.

The timing section functions to derive the synchronous DDS clock and primary clock signals from the DDS received data stream. The clocks are used to indicate when data bits are to be received and transmitted at the respective interfaces. Preferably, the timing section is based upon a phase locked loop circuit which uses the DDS received data as a reference input. The phase locked loop generates a signal which is at a frequency which is an exact multiple of the appropriate DDS clock rate and primary clock rates. This signal is applied to dividers inside the timing network to yield appropriate clock frequencies for the particular DDS network being utilized.

Before the phase locked loop can lock onto the incoming data stream from the DDS, the free running output stream of the voltage controlled oscillator in the phase locked loop is adjusted to a frequency range near the DDS bit rate. Immediately after power up, the controller adjusts the output frequency of the VCO to approximately the correct frequency to facilitate acquisition of the data signal. In making this initial VCO output frequency adjustment the DSU controller first measures the VCO's free running frequency without the DDS received data reference input. Based on this measurement the controller calculates and sets and adjustment setting to the VCO controller. This process is repeated until the appropriate center frequency for the VCO is reached. This initial VCO adjustment will be described in greater detail later.

DDS interface 108 serves to take the logic levels present at microcomputer controller 102 and convert those signals to proper amplitude and pulse shape for the DDS bipolar pulse format. These pulses are then applied to the DDS network preferably through a coupling transformer which serves as isolation from the network. DDS interface 108 also provides the various hardware loopback functions required for diagnostics by utilizing appropriately located loopback switches, as will be appreciated by those skilled in the art.

In the received mode, DDS interface 108 serves to convert DDS bipolar data into equalized filtered signals which are converted to appropriate logic levels and passed to the controller 102 for processing. Interface 108 is also used for performing channel loop-back of the DDS signal. This is performed when the DDS reverses the polarity of the line current. The signal received is then equalized and filtered and the loop back path returns this signal to the line driving circuitry of the transmitter for shaping to the proper pulse format. Loopback is required for various types of line and equipment testing for diagnostics as is known in the art.

Display/Control panel 116 provides display information, preferably using a liquid crystal display (LCD). The information on the LCD is derived from controller 102 via an eight bit data bus/three control line interface. The display/control panel also serves the function of allowing commands to be directly entered by the user into the DSU preferably by utilizing a four key touch-pad. In the preferred embodiment all DSU information may be displayed on the screen at the operator's request through the touch pad. This information includes operating speed, interface signal status, active tests/available tests, strapping (such as DSU configuration), DSU address (used for diagnostic pusposes), DSU alarms, DSU part number (stored in PROM), call feature codes and active loops/available loops. Preferably the display information is menu driven. Scrolling through the various menus is accomplished by utilizing the four touchpad keys. The display screen is used to prompt the user of the possible input keys for scrolling or selecting menus. Preferably the menus are divided into modes such as status mode, configuration mode and test mode. The status mode displays the current on/off status of the primary channel interface signal and may also be used in an alternative embodiment to display whether or not the DSU is in synchronization. Fluctuation of the signal may show up on the display as the signal status changes.

In the preferred embodiment, the user or a technicial selects first the type of DDS (I or II) which the DSU will be coupled to and next the data rate from Display/Control panel 116. Since this information is rarely changed, this is considered to be the most economical technique for determining this information. One skilled in the art will recognize that this information may be automatically derived from the DDS data stream however by addition of the appropriate hardware. The present invention contemplates this arrangement as an alternative embodiment.

The configuration mode allows scrolling through all current strap settings as well as all possible options for a given strap. In this mode the user can alter the DSU's configuration and characteristics by changing a particular strap option through the display. The test mode allows the user to invoke a particular test from the display/control panel. The various tests and loops available may be scrolled through until the desired selection appears on the display screen. The DSU can then be commanded to perform the selected tests. The test in progress is then displayed on the screen. When the test is completed, an error count is displayed where applicable. Preferably, the DSU includes an internal beeper which may be used to provide auditory feedback whenever one of the touch pad keys is pressed. The beeper may also be used to warn the user against improper or impossible inputs or to signal the completion of a test. In the preferred embodiment, the beeper is primarily used for equipment alarms and operator calls.

Configuration memory 118 is utilized to store configuration and strapping options for the digital service unit. Preferably the configuration memory is an electrically erasable nonvolatile memory but this is not to be limiting. An example of such memory in the commercially available 256 bit 16 by 16 arrangement such as the serial input output National Semiconductor ® NMC 9306 or similar. In another alternative, battery back-up CMOS memory may be used. In addition to configurations and options, the configuration memory preferably stores the DSU serial number. (A separate PROM is used to store the DSUs part number for use by the diagnostics.) The strapping options of the DSU may be altered by appropriate entries into the display/control panel 116. Preferably a nonvolatile memory is utilized so that configuration information does not have to be reentered at each power up.

Program guard 120 is used to monitor the operation both microprocessors of controller 102 to assure that both are functioning properly. If the program guard 120 detects that one of the processors is malfunctioning, it resets both processors so that the DSU is reinitialized.

Primary channel interface 104 is used primarily to convert the interface signal levels of DTE 110 to logic level signals and vice versa. Interface 104 inspects the interface signal to determine that the DTE i on and supplying a valid signal. For example, if the DTE interface signal conforms to the standard RS232, the primary channel interface has a DTE power failure detection circuit which monitors TXD line (Pin 2 of an RS232C connector) from the DTE. When the voltage level goes between +3 volts and +3 volts, the primary channel interface alerts the controller that the DTE 110 has lost power.

The transmit retiming circuit 124 is used to correct any phase difference between the external clock signal supply to the DSU and the internal primary clock derived from the DDS. The transmit data is clocked into the DSU from the primary channel by the external clock. However, the transmit data must be sampled by the controller 102 using its own internal primary clock. The retiming circuit 124 compensates for this time difference keeping the DSU synchronized to the DDS network clock.

In the preferred embodiment the secondary channel interface 106 is designed to operate with Racal Milgo ® T7 type diagnostics equipment such as the CMS-2000 series Diagnostics Controller which is commercially available. This is not to be limiting as the secondary channel can be used for other purposes besides diagnostics and can readily be adapted to function in diagnostic environments other than T7. The secondary channel interface, in addition to providing level translation similar to that in the primary channel interface, also provides a parallel connector so that more than on T7 type device can be daisy chained or paralleled at a central site. Secondary channel interface 106 also includes a customer alarm interface used to signal the DSU of an external alarm condition of the user's choosing. When this alarm is activated by the user the device will generate an external alarm Mayday on the secondary channel.

The DSU also preferably includes a central site interface (not shown) for use in high density central site applications. In this application the DSU will not operate in a standalone housing but will reside in card cage with multiple other DSU cards. All of the DSU cards will preferably share a common display/control panel.

Figure 5:
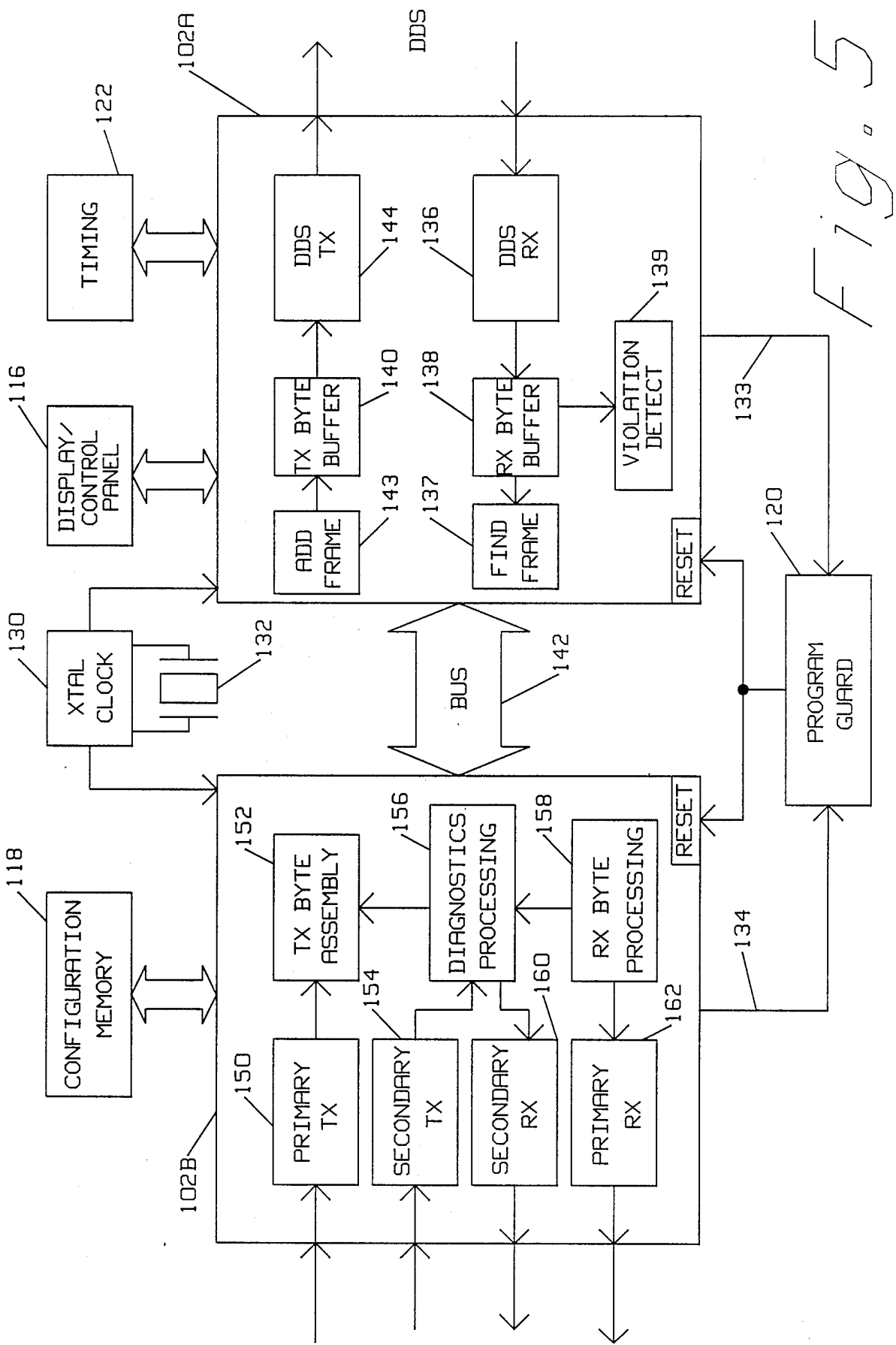
FIG. 5 shows a functional block diagram of the microprocessor or microcomputer based DSU controller of FIG. 4.

Turning now to FIG. 5 a functional block diagram of controller 102 for a subrate DSU is shown with individual processors 102A and 102B shown distinct. A crystal oscillator 130 controlled by a stable Quartz crystal 132 or other stable frequency source, provides clock information to processors 102A and 102B. In the preferred embodiment, a pair of crystal oscillators may be used and preferably the oscillator frequency is 11.7504 megahertz.

In normal operation, program guard 120 periodically recieves a pulse from processor 102A on line 133 and also periodically receives a pulse from processor 102 B on line 134. Program guard 120 includes a pair of missing pulse detectors which check to see that each processor periodically sends a pulse to the program guard. If the pulses are not sent at an appropriate time by either of the processors, the program guard resets both processors 102 A and 102 B.

The duties of processor 102 A and processor 102 B are divided to effect overall control of the DSU. In general, processor 102 A transmits and receives bits at the DDS interface as well as detects bipolar violations and finds and checks framing of the DDS data. The DDS clock coming from the timing circuit will signal the processor of the proper time to transmit and receive. A DDS bit is received by DDS RX block 136 and shifted into the RX byte buffer 138 on transitions on the DDS clock. When eight bits are recieved to make up a full DDS RX byte, the byte is preprocessed and sent to processor 102B for processing. The preprocessing includes finding and checking frame at 137 and detecting bipolar violations at 139. Likewise, for transmission of DDS information TX byte buffer 140 receives eight bit bytes of information from processor 102 B, after frame is added at 143, over Bus 142 and DDS TX block 144 transmit the byte serially to the DDS interface. After a complete TX byte of eight bits is transmitted, the next DDS TX byte is fetched from the TX byte buffer.

Processor 102 A is also responsible for display/control panel 116 operations. This includes sending display data to the display, maintaining the displays and responding to touch-pad input. Processor 102A also performs the function of adjusting the frequency of the phase locked loop in the timing circuit 122. This is accomplished by checking the output frequency of the VCO at power up and making adjustements to obtain the correct frequency.

Processor 102 B transmits and receives bits at the primary channel interface. The primary clock coming from the timing block will signal the processor of the proper time to transmit and receive. A primary bit is shifted in and shifted out on transitions in the primary clock. When six bits have been received by the primary TX 150 they are shifted to TX byte assembler 152 to be formatted for transmission through the DDS. When six bits have been transmitted, six more are fetched from the primary RX where they have been stored in a buffing operation after being received from the DDS. The control signals of the primary channel are also controlled and generated by processor 102B. Information transmitted by the secondary channel is received by secondary TX 154 where it is passed on for diagnostic processing in diagnostics processor 156. Diagnostics processor 156 passes diagnostic information to TX byte assembler 152 for assembly of a complete DDS byte to be transmitted. When the DDS byte is fully assembled it is passed on bus 142 to processor 102 A. Preferably, diagnostics processor 156 operates as an asynchronous to synchronous conversion is needed to accommodate the synchronous nature of DDS.

Received bytes are passed through bus 142 to received byte processor 158 which disassembles the DDS byte and sends secondary channel information to diagnostics processor 156. Diagnostics processor 156 passes this information serially to secondary RX 160 for receipt by the diagnostics controller. Similarly, primary channel data is converted from six bit parallel to serial and transmitted via primary RX 162 to the DTE.

The DDS clock will interrupt the normal processing indicating a new DDS bit must be received from the DDS interface. The DDS RX bits are shifted into memory and eight consecutive bits are received to make up a DDS RX byte. When a complete DDS RX byte is received it is placed in a buffer to be processed. The location of the F bit is determined in order to make timing adjustments to obtain frame synchronization. Interruption by the DDS clock also indicates that the next DDS bit is to be transmitted. The DDS TX bits are shifted out of memory and a complete DDS TX byte is transmitted after eight consecutive bits. After a DDS TX byte is transmitted the next byte is fetched from a buffer containing the most recently assembled DDS TX byte. Interruption of normal processing by the primary clock indicates that a new primary bit must be received from the primary channel interface. The primary TX bits are shifted into memory and six consecutive bits received make up a primary TX byte. When the entire primary byte is received it is placed in a buffer to be processed. Interruption of normal processing by the primary clock also indicates that the next primary bit is to be transmitted. The primary TX bits are shifted out of memory and a complete primary RX byte is transmitted after six consecutive bits. After a primary RX byte is transmitted the next byte is fetched from a buffer holding the most recently assembled primary RX byte.

When processing a received DDS byte (DDS RX Byte), the last DDS RX Byte is fetched from a buffer and must be processed in the amount of time it takes to receive the next DDS RX byte. On power up the DSU will be receiving 8 bit bytes from the DDS lines. These bytes most likely will be skewed from the byte format of FIG. 1, i.e., not in frame. The DSU must search for the location of the framing bit and make the adjustment to get the F bit to the proper position.

In finding the position of the F bit, the firmware compares 6 consecutive values of each bit location to the repeating framing pattern. When a match is found, the firmware can make the correct adjustment to get the F bit to the proper location. From this point, the device will be in frame and known the next expected value in the framing pattern.

The first step in processing a DDS RX Byte is to check for framing. The F bit of the DDS RX Byte is compared to the expected value of the framing bit in the framing sequence. If these values match, then the DSU is still assumed to be in synchronization and the DDS RX Byte can be processed. If the values do not match, then the DSU has lost frame. The DSU will then cease normal operations and again start trying to synchronize to the DDS received data as previously described.

If the received secondary channel is inactive, then no S bits are being received and the device will treat all received C/S bits as control bits. While the secondary channel is inactive, the firmware must continuously search for secondary channel activity. When the secondary channel begins going active, the training sequence of at least six zero information bits (S bits differing from their preceding C bits) will be received.

While secondary channel bits are being received, the two C bits between consecutive S bits will both be (1) or (0). Transitions in the primary channel between control and data mode may or may not occur while the secondary channel is coming active. These transitions will be seen in the C bits during the training sequence. Either way, at least one of the following sequences will be received during the training interval:
C/S bits:

| C C S C C/S | |
|---|---|
| 0 0 1 0 0 1 | Primary Channel in Control Mode |
| 0 0 1 1 1 0 | Primary Channel Switching from Control Mode to Data Mode |
| 1 1 0 1 1 0 | Primary Channel in Data Mode |

The firmware will compare the last 6 consecutive S/C bits received to each of the above sequences. A match will signal the secondary channel coming active as well as the location of the S bit in the S/C bit sequence. At this point the secondary channel will be considered to be in an active state.

Following the reception of the complete training code, S bits will contain secondary channel information.

The S bits are decoded by performaing the EXCLUSIVE NOR with the previous C bit. The resultant bit will be the secondary channel information bit and is passed to the diagnostic section of the DSU.

During the time the secondary channel is active, the DSU must continue looking for the secondary channel going idle. When the secondary channel goes idle, twelve consecutive one (1) bits will be received as an idle code (S bits equal to their preceding C bits). After the complete idle code has been received the secondary channel will be considered inactive.

The value of the last received C bit will determine the mode of the D bits. A C bit set to a binary 1 indicates data mode and a C bit set to a binary 1 indicates data mode and a C bit set to binary 0 indicates control mode. During this control mode, the primary channel received interface remains idle. The D bits are examined for control information codes. The possible control codes are the Control Mode Idle (CMI) code (111111), the abnormal station code (001111), or the out-of-service code (either 001100, 000000, or 001101). A CMI code merely indicates that no primary channel data is being transmitted at this time.

An abnormal station code is sent by the DDS network to indicate a failure in the far end user's equipment or in the local loop in the direction of transmission toward the network. It will occur upon total loss of signal or loss of framing from the local loop. Reception of this signal can also indicate that the far end user equipment has been removed. The out of service codes indicate failures within the DDS network and can be generated in a variety of ways. Responses to abnormal station codes and out-of-service codes are handled by the diagnostic section and these conditions may be displayed on the front panel.

When the D bits change to the data mode, they are passed on to the DTE as primary channel data. The first three bytes may contain all marks due to the possible DDS network overwrite of the first one, two or three data mode bytes with data mode idle bytes in multipoint circuits. After the first data mode byte is received, the DCD (Data carrier detector) signal is raised and the following D bits are passed to the primary channel interface. The DCD signal is lowered again when the D bits return to the control mode.

A new formatted DDS transmit byte (DDS TX Byte) must be assembled before the entire last DDS TX Byte is transmitted out on DDS. After the byte is assembled it is placed in a buffer to await transmission. The current state of the primary channel interface signals RTS (request to send) and CTS (clear to send) determine the mode of the primary channel and thus the contents of the D bits in a DDS TX Byte.

The signal RTS going on indicates that there is primary channel data to be transmitted through the network. Before the device will raise CTS and begin accepting primary channel data, a startup pad of 3 data mode idle bytes will be transmitted (D bits set to all marks). This is because the network may overwrite up to the first 3 data mode bytes with a data mode idle code in multipoint circuits as previously mentioned. The delay then, from RTS ON to CTS ON, is due to the transmission of this startup pad and the internal delay in switching to data mode before initiating startup pad transmission. Thus, the ON condition of CTS in response to an ON condition of RTS could be delayed by a maximum of 5 byte times.

When CTS is raised, data is accepted from the primary channel interface and 6 bits of primary channel data will be put in the D bits of each of the DDS Tx Bytes. This will continue until the DTE lowers RTS, thus completing a transmission. The DSU will then lower CTS and return to the idlemode, i.e. sending CMI (control mode idle). However, the DDS network requires that once in the data mode, the station should remain in that state for a minimum of four bytes. The DMI (data bode idle) code will be sent to complete the minimum required data bytes if RTS is lowered too quickly.

Every S bit will contain secondary channel information when there is secondary channel data to be transmitted. Otherwise, the S bit will be set to the value of the preceding C bit. Initially when there is secondary channel data to be transmitted the training sequence is sent out. The secondary channel data bits are then encoded by performing the logical EXCLUSIVE NOR with the preceding C bit to form the S bit to be transmitted. When all secondary channel data has been transmitted, the idle sequence is transmitted. Because the idle sequence consists of 12 consecutive one bits, secondary channel data may not contain more than 11 consecutive binary 1 bits.

The C bits between consecutive S bits will be set according to the mode of the D bits when the secondary channel is active. However, the primary channel changing to data mode can only be conveyed by C bits following an S bit. This is because only C bits can carry mode information. C bits between consecutive S bits are identical. In other words, if the actual mode of the primary channel changes to data mode during bytes where an S bit is to be transmitted or a C bit preceding an S bit, the information will not be conveyed until the next C bit. While waiting for the next C bit to begin primary channel data transmission the CMI code is sent.

In the preferred embodiment, T7 diagnostics are utilized as follows. T7 data will be passed through the network a byte at a time. To compensate for the difference in data rates between DDS secondary channel and T7 device channel, a sort of asynchronous protocol is used. A T7 byte to be passed through the nework is preceding by a start bit (1) followed by a mode bit followed by the 8 bits of the T7 byte (7 data, 1 parity) followed by a stop bit (0). Stop bits will be sent until the next T7 byte is available to be passed through the network. Also, by imposing this type of protocol, the conversion between the synchronous DDS secondary channel and the asynchronous T7 channel is accomplished.

In central site applications, asynchronous T7 data comes in on the Secondary Interface. A UART on Processor 102 B of the controller accepts the data. After the T7 byte is received, a start bit is transmitted on the network. The start bit is followed by the received byte. Stop bits will be sent while waiting for the next byte to come in, thus, adjusting for rate differences.

In Remote site applications, the outbound T7 traffic is received from the network after the start bit. The 8 bits following a start bit will be taken as a T7 byte and delivered to the internal T7 section of the DSU and to a second level T7 device on the T7 RXD pin of the Secondary Interface. The stop bits between the bytes will be ignored.

A Space Tone control code (Break) is generated in the outbound direction by a diagnostic controller to cause all T7 devices in the circuit to "Re-Initialize".

The DSU will be able to detect the Space Tone and pass it through the DDS network. A controller will send the Space Tone to a central site DSU on the Secondary channel Interface. The Space Tone is detected when the UART in the DSU controller receives a long string of zeros for a given period of time (600 msec.) without the appropriate stop bits. Part of the central DSU's response is to transmit downstream on the secondary channel of DDS that a Space Tone has been detected. A remote DSU will detect the Space Tone from the DDS secondary channel. This DSU then passes the Space Tone out on the Secondary Interface by holding the transmitting UART low for one second.

Inbound T7 data in multipoint circuits will be sent through the DDS network a byte at a time. That is to say, each inbound T7 byte to be transmitted on DDS will be preceded by the training code and followed by the idle code. Inbound T7 data will not only contain T7 replies but may also contain Maydays being sent upstream to the controller.

It is very difficult to determine the beginning and end of a message going inbound and undesirable to try. There are several T7 protocols defining a T7 message currently employed, each one differing from the others. In sending the messages a byte at a time, the DSU can be transparent to the T7 data being transmitted. By wrapping each inbound T7 byte with the training code and idle code, the MJU is locked onto one particular remotes' secondary channel for a shorter time. This will allow more opportunity for Mayday bytes being generated from a remote to get through while another remote is transmitting T7 data. The extra formatting (training and idle for each byte) to transmit each individual T7 byte reduces the transmission rate through the network but helps ensure that Maydays will be detected. The rate T7 bytes are coming into the device may be faster than the bytes can be transmitted on DDS, depending on the DDS rate. In this case, the T7 bytes will be buffered in a FIFO arrangement, where the buffer size depends on the DDS rate and T7 message length. Below is a table showing the problem areas

| DDS RATE | DDS SECONDARY CHANNEL RATE* | T7 RATE** |
|---|---|---|
| 2.4K BPS | 100 BPS = 3.7 BYTES/SEC | 75 BMP = |
| 3.2K BPS | 133 BPS = 4.9 BYTES/SEC | 6.8 BYTES/SEC |
| 4.8K BPS | 200 BPS = 7.4 BYTES/SEC | |
| 6.4K BPS | 267 BPS = 9.9 BYTES/SEC | |
| 9.6K BPS | 400 BPS = 14.8 BYTES/SEC | |
| 12.8K BPS | 533 BPS = 19.7 BYTES/SEC | |

*A DDS Secondary Byte is made up of 27 bits-6 training code bits, 1 start bit, 8 data bits, and 12 idle code bits.
**A T7 Byte is made of 11 bits, 1 start bit, 8 data bits and 2 stop bits.

There are 2 cases were inbound T7 data should be buffered in the preferred embodiment because the T7 rate is faster than DDS Secondary Channel rate. These cases are as follows:

Case 1: T7 Rate=75 BPS DDS Rate=3.2 K BPS

The ratio between DDS rate and T7 rate is approximatey 3:4. In other words, the time it takes for 4 T7 bytes to come in, can only get 3 out on DDS.

Therefore, there should be an additional 1 Byte buffer for every 4 T7 Bytes.

Case 2: T7 Rate=75 BPS DDS Rate=2.4K BPS

The ratio between DDS rate and T7 rate is approximately 1:2. Therefore, there should be an addition 1 byte buffer for every 2 T7 bytes.

In central site applications, inbound T7 traffic (T7 bytes) may come from the DDS secondary channel or from the device's internal T7 section. In either case, the bytes are transmitted out on the Secondary Interface. The T7 DCD signal is turned on just before (two "mark" byte times) transmission begins and remains on as long as there are bytes to be transmitted. When transmission ends, T7 DCD is turned off waiting a T7 byte time to ensure the last byte has been transmitted out.

If a Mayday is being generated, there may be T7 bytes available from both the DDS lines and the internal T7 section. In this case, the T7 data received from DDS will be given priority and passed out the Secondary Interface without regard to the internal T7 data. Thus, transmission of the central DSU's T7 data will be inhibited as long as T7 data is detected from the DDS lines. This will cause the T7 messages being generated by the central CSU to be broken up by T7 data coming from the DDS secondary channel when occurring at the same time.

In remote site applications inbound T7 traffic at a remote site may have two points of origin. The T7 bytes may be generated from the T7 section of the device itself or from a second level T7 device downstream. In the case of a second level T7 device, the bytes will be received from the T7 TXD pin of the Secondary Interface. The T7 RTS signal must be on before the first byte of the T7 data is received. Shortly after transmission has ceased, the T7 RTS may go off.

Again, there may be T7 bytes available from both the internal T7 section and an external second level T7 device when a Mayday is in progress. In this case, the data from the second level T7 device will be given priority and transmitted on the secondary channel of DDS without regard to the internal T7 data. Thus, transmission of the remote DSU's T7 data will be inhibited when T7 data comes in from the second level device. The internally generated T7 messages are broken up while the second level T7 data is passed through.

At the time of power up, as previously noted, it is also desirable to adjust the frequency of the timing circuit to correctly match that of DDS data. This process is best understood by reference to FIG. 6.

Figure 6:
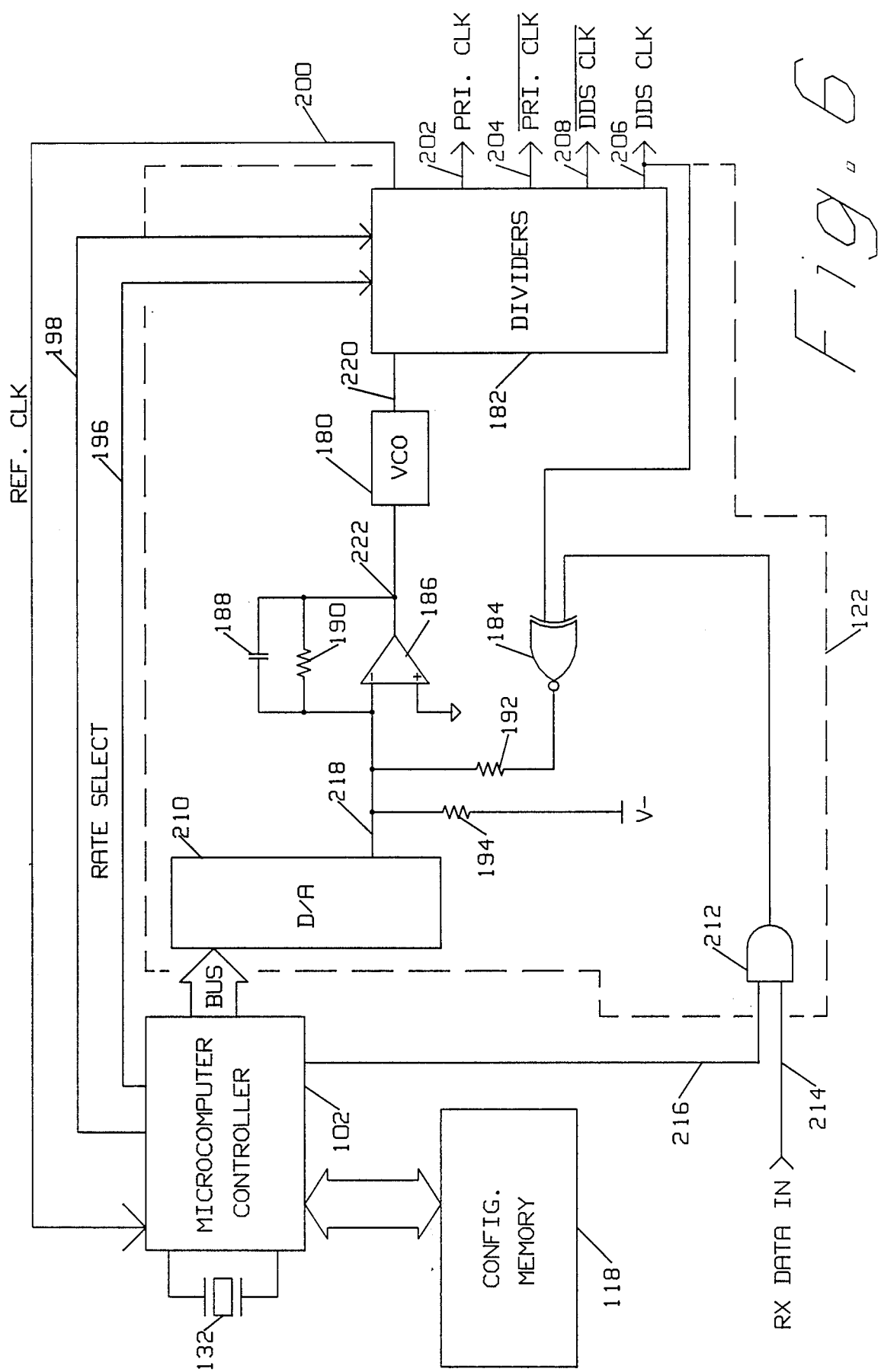
FIG. 6 shows the circuit configuration of the DSU during power up adjustment of voltage controlled oscillator.

Turning now to FIG. 6, a more detailed schematic representation of a portion of timing circuit 122 is shown. This circuitry is operated at power up to effect adjustment of the clock frequency. The heart of the timing circuit is a phase locked loop formed by voltage controlled oscillator (VCO) 180, programmable frequency dividers 182, EXCLUSIVE NOR gate 184 (used as a phase detector) and a low pass filter represented in this schematic by operational amplifier 186 capacitor 188 and resistor 190. Programmable dividers 182 are controlled by rate select lines 196 and 198 from microcomputer controller 102. Rate select lines 196 and 198 are logic lines which are set by the microcomputer controller 102 after reading the configuration memory to determine the speed of the DDS. Dividers 182 include a plurality of fixed and variable dividers utilized to set a total of five clock frequency outputs used in various circuitry throughout the DSU. These outputs are designated reference clock 200, primary clock 202 the compliment of the primary clock 204, DDS clock 206 and the compliment of DDS clock 208. The DDS clock output 206 is fed back through one input of phase detector 184 to the low pass filter which filters the DDS clock signal and applies it to the voltage controlled oscillator 180.

Resister 194 is connected to the negative power supply voltage on one end and to the input of the operational amplifier at the other. The input of the operational amplifier is also coupled to a digital to analog converter 210. Digital to analog converter 210 is controlled by a bus output from microcomputer controller 102. The second input of EXCLUSIVE NOR gate 184 is driven by an AND gate 212 which receives data in on a first input and receives a second input (inhibit control) from controller 102. AND gate 212 operates as a switch to either inhibit or allow data to enter the phase locked loop at phase detector 184.

At power up, controller 102 applied a logical zero to line 216 inhibiting data on line 214 from entering phase detector 184. The output at line 220 of VCO 180 is therefore the free running frequency of the voltage controlled oscillator. This frequency is divided in dividers 182 by a factor of 16 to create the reference clock signal at line 200. The reference clock is delivered to controller 102. Controller 102, being controlled by a highly stable crystal 132, measures the reference clock frequency by counting the number of clock transitions which occur over a predetermine interval. It then determines what frequency the VCO 180 is operating at. If the frequency of the VCO is incorrect or outside a predetermined range appropriate for operation at the selected DDS rate, controller 102 loads a new value between 0 and 255 to an 8 bit digital to analog converter 210 instructing the digital to analog converter to adjust the reference current entering node 218 thereby charging the voltage at node 222. This effects an adjustment of the VCO frequency by changing the DC voltage on its control input. The process previously described is now repeated for the new VCO frequency to determine whether or not an appropriate amount of adjustment has occurred. If not, further adjustment to the VCO frequency is effected by controller 102 until the reference clock frequency is appropriate for the selected DDS channel.

One skilled in the art will recognize that there are numerous processes for adjusting the frequency of VCO 180 under microcomputer control. In the preferred embodiment of the present invention, the following process is utilized to rapidly set the voltage controlled oscillator 180 to the correct frequency. In the preferred embodiment, an 8 bit digital to analog converter is used so there are 256 possible output levels corresponding to 256 possible 8 bit binary inputs. Initially the digital to analog converter is set to a binary 128, i.e. the center of its range. If the output must be reduced as a result of measuring the frequency, the binary number is halfed to a binary 64 and the frequency is again measured. Similarly, if the number is increased, the binary number is increased by half its available range to 192 and the frequency is again measured. This process is repeated by adding or subtracting half the available range to the previous binary number until the VCO frequency is set as close as possible given the accuracy of the digital to analog converter. For an 8 bit digital to analog converter, a maximum of 8 interations of this process are required to set the VCO frequency. For example, if the correct setting is a binary 59, the process would produce the following sequence of settings: 128, 64, 32, 48, 56, 60, 58 and 59.

After the frequency of the VCO has been set, microcomputer controller 102 changes control line 216 to a logical one which allows data at line 214 (RX data from RX level converter 230 of FIG. 7) into phase detector 184. At that point the phase locked loop will rapidly acquire phase with the incoming data and lock. By utilizing the present arrangement for training the phase locked loop, an inexpensive analog phase locked loop can be utilized rather than a more expensive digital PLL or crystal controlled phase locked loop. In essence, the high stability crystal of controller 102 is used to adjust the frequency of the phase locked loop rather than utilizing a highly stable phase locked loop initially. This reduces the cost of the DSU by reducing the number of high stability crystal oscillators required while sacrificing essentially no performance.

When the bipolar DDS waveform is transmitting from the DDS network to the DSU, the signal typically starts out having voltage levels of approximaty +3 volts to +3 volts in amplitude. However, in some instances line losses may reduce the signal level to as low as approximatey +60 millivolts to −60 millivolts or even lower by the time it reaches the digital service unit. At these levels, DC offset in the DSU receiver amplifiers and filters can substantially impact the quality of the received data as perceived by the DSU. The circuit arrangement shown in FIG. 7 represents the DSU configuration at power up used to cancel the effects of DC offsets.

Figure 7:
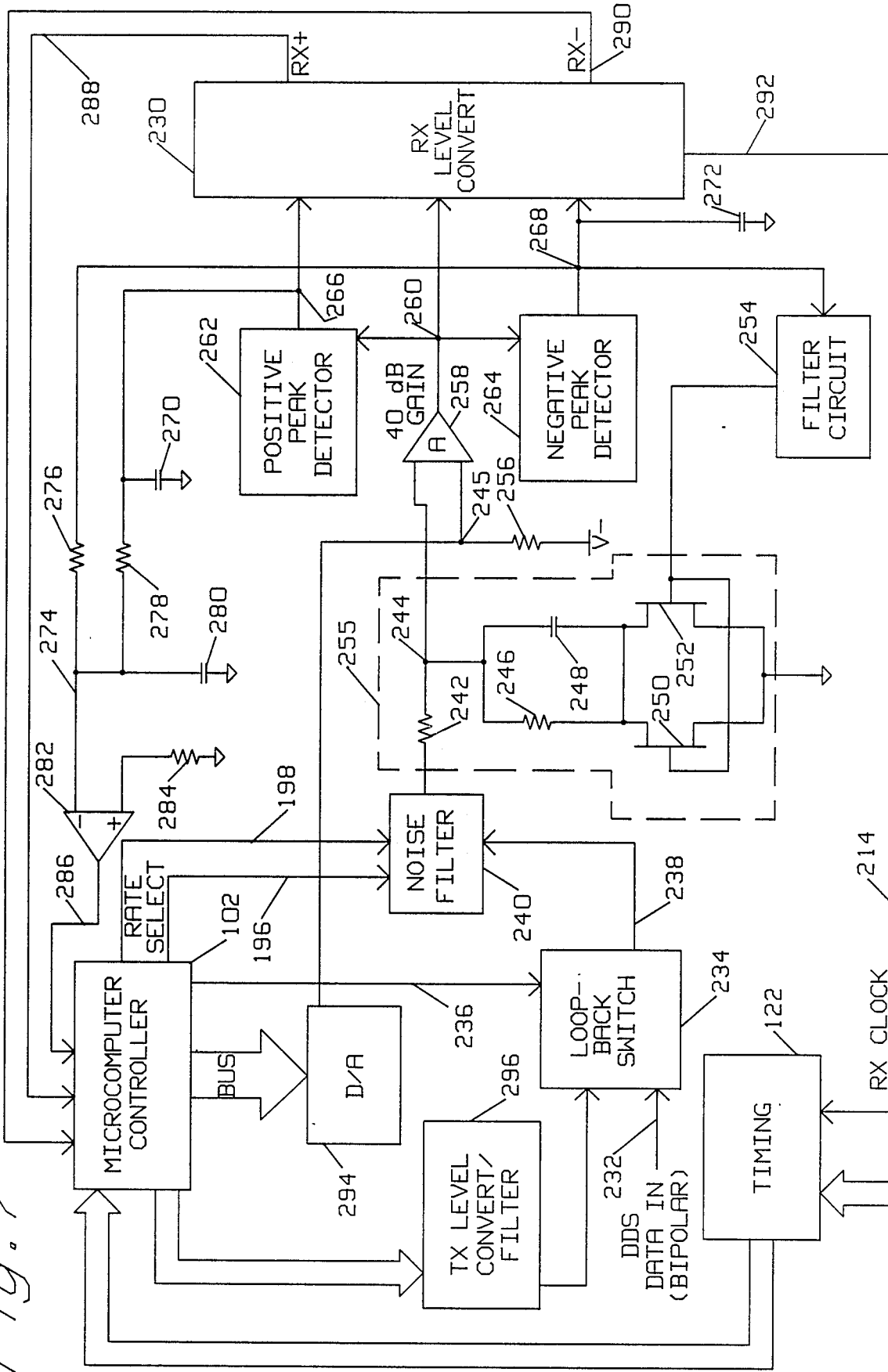
FIG. 7 shows a circuit diagram for the DSU configuration during adjustment of the operational amplifier bias levels.

Turning now to FIG. 7 bipolar DDS data from an output coupling transformer (not shown) is applied to node 232 of a loop back switch 234. Loop back switch 234 is used to set the DSU in a test configuration which loops the transmiter to the receiver as will be understood by those skilled in the art. Loopback switch 234 is controlled by controller 102's control line 236 and provides an output 238 to an adjustable noise filter 240. Preferably adjustable noise filter 240 is a two stage operational amplifier based three pole low pass filter having corner frequency approximately equal to 1.3 times the line rate. The corner frequency of the noise filter is determined by the binary levels present at lines 196 and 198. In the preferred embodiment conventional operational amplifier filters are implemented utilizing analog switches controlled by rate select lines 196 and 198 to switch in and out various resistor and capacitor values to effect the appropriate noise filter characteristics.

The output of noise filter 240 is applied through a resistor 242 to node 244. Node 244 is also connected to a parallel resister capacitor circuit made up of resister 246 and capacitor 248. The output of the parallel resistor capacitor circuit is applied to the source drain circuit of a pair of field effect transistors 250 and 252 coupled to ground. The gates of transistors 252 and 250 are coupled togehter and are controlled by the output of a filter circuit 254. The circuit shown in broken lines and designated generally as 255 is commonly known in the art as an ALBO circuit and is described in detail in the May–June 1975 issue of "The Bell System Technical Journal", Vol. 54, No. 5, pages 919-942 in an article entitled "Local Distribution System", by E. C. Bender, et al.

Coupled to node 245 is a second input to amplifier 258 and a resister 256 which is connected to the negative power supply line. Node 244 also forms an input of a multiple stage amplifier 258 which preferably includes a buffer stage and two stages of gain to produce a total of 40 DB gain for the amplifier 258. The output of amplifier 258 at node 260 provides an equalized DDS signal which is applied to a positive peak detector 262 and a negative peak detector 264 as well as to RX level converter 230. Positive and negative peak detectors 262 and 264 preferably utilize operational amplifiers to achieve an active rectifier circuit to closely simulate ideala diodes at their outputs 266 and 268 respectively. The outputs are held by capacitors 270 and 272 and applied to node 274 through resisters 276 and 278. Node 274 is coupled to a capacitor 280 to ground and to the negative input of a comparator 282. The positive input of comparator 282 is also coupled to ground through a resister 284. Preferably comparator 282 is formed from an operational amplifier having positive feedback to achieve a degree of hysteresis and functions to compare the signal at node 274 with the receive ground level. The output of comparator 282 at node 286 is coupled to controller 102.

Nodes 266 and 268 are also connected to receive level converter 230 which processes the incoming positive and negative peak signals as well as the equalized signal at node 260 to convert the AMI format signal into a receive positive and a receive negative signal at nodes 288 and 290. In effect, RX level converter 230 converts a single line of bipolar DDS data into two separate lines having appropriate logic. One line represents the positive pulses of the DDS bipolara data and the other represents the negative pulses of the bipolar DDS data. In addition, RX level converter 230 produces an output at line 292 designated RX data which is equivalent to line 214 of FIG. 6. This signal is essentially an absolute value of the DDS signal which is also translated into logic levels. Therefore, at line 214 there is a positive logic pulse corresponding to every positive or negative DDS pulse. This signal at line 214 is delivered to timing circuit 122 as previously described. Timing circuit 122 takes the RX data signal as well as other clock related input information and provides microcomputer controller 102 with various clock signals used to effect operation of the DSU.

A digital to analog converter 294 is coupled via a data bus to controller 102 and applies an analog output to node 245. Controller 102 also delivers data to a transmitter level converstion circuit 296 which is looped back through loop back switch 234 to provide a DDS format signal to noise filter 240 to effect the offset adjustment to be described. Normally, TX level converter and filter circuit 296 forms a part of DDS interface 108 and effects logic level to AMI translations for transmission of data on the DDS. Circuit 196 also includes low pass filters with corners at 1.3 times the line rate as well as notch filters at 28 KHZ and 56 KHZ for crosstalk protection (in subrate DSU; no notch filtering is present in the 56 K BPS DSU).

At power up, the loop-back switch 234 is set by control line 236 of controller 102 to receive data from TX level converter 296. That data is applied to noise filter 240 which is adjusted to the appropriate filter characteristics as determined by the configuration memory and controller 102 via rate select lines 196 and 198. The signal is in turn applied to amplifier 258 and positive and negative peak converters 262 and 264. The output at node 268 at the negative peak detector is filtered by filter circuit 254. The output of filter 254 adjusts the voltage of the gates of transistors 250 and 252 so that these transistors are operating as variable resisters to effect equalization of the signal at node 244. This circuit acts as an automatic gain control and eualizer configuration so that the signal level at node 244 is adjusted to a substantially constant level regardless of the signal level at node 238.

The outputs of positive and negative peak detectors 266 and 268 are averaged at node 274 and compared with receive ground by comparator 282. By monitoring the voltage level at node 286, controller 102 can determine whether the offset of the amplifiers used in filter 240, amplifier 258, ect., is resulting in a positive or negative offset. Controller 102 then applies apropriate binary codes to D to A converter 294 which applies a DC voltage to node 245 to counteract the offset voltage. In this manner, the offset at node 260 is adjusted by repeated iterations until the total offset approaches zero volts.

DDS-I differs from DDS-II (DDS-SC) is several ways. In order to achieve compatibility as well as secondary channel capability in DDS-I for point to point circuits, these basic differences must be overcome. DDS-I circuits do not have the MJU capability needed to synchronize primary and secondary channel data from various remote sites in a multipoint configuration. Therefore, diagnostic or other secondary channel activities cannot readily be handled in a noninterruptive manner by the present invention. However, this is a function of telephone company equipment located at the telephone company's office. If however the telephone companies instituted suitable modifications to the DDS MJUs used for DDS-I, multipoint capability with secondary channel would be possible. The present invention does, however, contemplate noninterruptive point-to-point diagnostics in DDS-I.

In DDS-I data is transmitted as a continuous bit stream rather than the formatted eight bit bytes utilized in DDS-II. In addition, the bit rates utilized in DDS-I are also different from those in DDS-II as shown by the tables of FIGS. 8 and 9. Ordinarily, data rates of 9.6 KBPS, 4.8 KPBS and 2.4 KBPS are available with DDS-I. These are the same rates as the primary channel rat available for subrate DDS-II. By imposing the byte format of DDS-II on DDS-I as described by the present invention, a secondary channel capability can be achieved having the rates shown in FIG. 9. However, in order to achieve secondaray channel capability the primary data rate is reduced by a factor of one fourth. This results in primary data rates of 7.2 K, 3.6 K and 1.8 K. In many instances this reduced data rate is no problem since the nature of the data transmitted over such systems is frequenctly bursty. Also, it is frequently possible for a user of DDS-I at a data rate of 2.4 K to upgrade readily to a 4.8 K bit rate and utilize 3.6 KBPS for primary channel and 200 BPS for secondary channel. The secondary channel rates available for DDS-I are generally quite adequate for secondary channel use in diagnostics which typically operate at 75 BPS. Although the primary channel data rates are somewhat less standard than the primary data rates in DDS-II, those skilled in the art will readily know how to adapt the equipment to operate at these rates.

In DDS-II, control sequences are time multiplexed with primary and secondary data. In DDS-I, the network transmits control information to the DSU through the use of bipolar violations as is known in the art. Of course, the DDS network deals with such bipolar violations in a manner which results in an overall long term zero volts DC component.

In order to achieve compatibility with DDS-I the received data coming into the DSU controller will be split by the DDS interface 108 into two signals, one containing the DDS positive pulses and the other containing DDS negative pulses. Each time the controller 102 receives a binary 1, whether positive or negative, the controller will check to see if the last binary violations occurring when two consecutive ones of the same polarity are received. The controller will then examine the DDS received data to determine which bipolar violation sequence is occurring. Those skilled in the art will reconize that bipolar violations sequences used to represent idle channel, out of service, etc., are defined by the specifications of the DDS-I network and need not be repeated here. The controller therefore is able to discern bipolar violations from the logic data transmitted from interface 108 to controller 102 and may therefore understand the bipolar violation codes present on the DDS-I network. Similarly, by transmitting signals on two logic lines, one representing positive pulses and one representing negative pulses of DDS data, to DDS interface 108 bipolar violations may be transmitted by the DSU over the DDS network.

In point to point communication it is only necessary for a limited number of bipolar violation control sequences to be understood and/or transmitted by the DSU. Those sequences are the idle sequences, the out of service sequence and the zero suppression sequence. If there is a failure on the cable pair that is carrying signals to the telephone office equipment from the DSU, the DSS equipment at the central office detects this condition and transmits the repetitive idle sequence to the far end DSU. This same sequence results when no pulses are being transmitted thus this sequence is analogous to the abnormal station code used in DDS-II. It sould also be noted that this idle sequence is not required to indicate an inactive primary channel. Since the DSU is imposing DDS-II coding on the data, the same control mode idle and data mode idle codes will be used on DDS-I and DDS-II to indicate idle primary channels to the far end DSU. Other control sequences may be transmitted and received by the DSU by utilizing the control bit of the DDS-II frame in DDS-I.

When there is a failure in the DDS-I network the network sends a repetitive out of service sequence to the DSU. It is of course desirable for the DSU to be able to detect this condition.

The DDS-I specification also requires that any sequence of six consecutive zeros must be encoded with a bipolar violation code known as the zero suppression sequence. In general, this is the only bipolar violation sequence the DSU must transmit over the DDS. It should be noted however that strings of six or more data zeros may be broken up by the framing pattern and therefore it may not be necessary to always transmit a zero suppression sequence in a DDS-I network. When a bipolar violation is received and detected by the DSU the violation code is read and the DSU determines whether it is an idle code, zero suppression code or out of service code. If the idle code or out of service code is received, a flag is set for diagnostics and demultiplexing to indicate that either the far end or the network is down. If zero suppression is received, six zeros are substituted for the 6 bit violation sequence.

In summary, to achieve compatibility with both DDS-I and DDS-II, the DSU must be capable of locking to bit rates of 2.4 K, 3.2 K, 4.8 K, 6.4 K, 9.6 K and 12.8 KBPS. It also must be capable of encoding and decoding control information using the frame format of DDS-II and must be capable of understanding bipolar violation codes of DDS-I as well as being able to transmit bipolar violations to affect zero suppression.

Those skilled in the art will recognize that various diagnostics protocols can be used in conjunction with the secondary channel in accordance with the present invention. Preferably diagnostics such as those described by Rosbury et al. in U.S. Pat. No. 4,385,384 is used but of course this is not limiting. The types of testing described in conjunction with modems in this patent may, in general, be used in conjunction with the present digital system. Also, it is clear that the present digital network may be mixed with the modem based network described in Rosbury et al. The basic differences in the type of diagnostics which be be performed relate to the use of transmitted tones to indicate power failure, and the exact Mayday signaling arrangement. These are minor differences, however, which may be readily accommodated by those skilled in the art to achieve noninterruptive diagnostics in light of the description above of the present invention.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A circuit arrangement for receiving primary and secondary communication over either a DDS-I or a DDS-II network, said circuit arrangement comprising:
    input means for receiving AMI data signals from one of said networks, said AMI signals including a primary channel signal multiplexed with a secondary channel signal, a multiplexed control signal and, if said network is a DDS-I network, said AMI signals also possibly including bipolar violations;
    determining means for determining which of said networks is coupled to said input means and for providing an output signal indicative of whether the input means is connected to a DDS-I or a DDS-II network;
    violation decoding means, coupled to and receiving AMI data signals from said input means and receiving said output signal from said determining means, for decoding bipolar violations in said data signal into a first network control signal if required as indicated by said output signal;
    demultiplexing means, coupled to said determining means and receiving said output signal, said demultiplexing means operating at a frequency determined by said output signal from said determining means, said demultiplexing means for demultiplexing said data signal received from said input means into a primary channel signal, a secondary channel signal and a second network control signal;
    controller means for receiving said first and second network control signals;
    primary output means for supplying said primary channel signal as an output; and
    secondary output means for supplying said secondary channel signal as an output.

2. The circuit arrangement of claim 1, further including an adjustable clocking means, responsive to said signal received from said determining means, for producing clock signals.

3. The circuit arrangement of claim 1, wherein said AMI data signal is formatted as a DDS-SC frame and said demultiplexing means demultiplexes said DDS-SC frame formatted AMI data.

4. The circuit arrnagement of claim 1, further including a diagnostics controller coupled to said secondary output means for receiving said secondary channel signal.

5. The circuit arrangement of claim 1, wherein said first network control signal includes a bipolar violation encoded zero suppression signal.

6. The circuit arrangement of claim 1, wherein said first network control signal includes an out of service signal.

7. The circuit arrangement of claim 1, wherein said first network control signal includes an idle channel signal.

8. The circuit arrangement of claim 1, wherein said determining means includes means for manually entering information indicative of the type of network and line rate of the network.

9. A circuit arrangement for transmitting primary channel data and secondary channel data, each comprising data bits, to a DDS-I network or a DDS-SC network, said circuit arrangement comprising:
    primary input means for receiving primary channel data and producing a primary output;
    secondary input means for receiving secondary channel data and producing a primary output;
    control means for generating a first network control signal and producing a primary output;
    multiplexing means receiving said primary and secondary outputs, for multiplexing said first control signal, said primary channel data and said secondary channel data to form a multiplexed data signal;
    determining menas for determining which of said networks is to receive said multiplexed data and for producing an output signal indicative thereof; and
    violation encoding means for encoding said multiplexed data signal with bipolar violations representing a second network control signal when said multiplexed data signal is trnsmitted on a DDS-I network as indicative by the output signal from said determining means.

10. The circuit arrangement of claim 9, wherein said multiplexing means combines six data bits from said primary channel data with a frame bit and a shared secondary channel and control bit to form a DDS-SC frame of data.

11. The circuit arrangement of claim 9, wherein said multiplexing means combines seven data bits from said primary channel data with a frame bit and a shared secondary channel and control bit to form a DDS-SC frame of data.

12. The circuit arrangement of claim 9, wherein said second network control signal includes a violation encoded zero suppression signal.

13. An apparatus for conditioning DDS-SC frame formatted data for transmission over a standard DDS-I network having a standard DDS-I bit rate, comprising:
    means for setting a transmission bit rate of said DDS-SC frame formatted data to correpsond to the bit rate of said standard DDS-I network;

means for encoding said DDS-SC frame formatted data with at least a first predetermined network control code as a bipolar violation and providing an encoded output; and means coupled to said encoding means and receiving said encoded output for transmitting said frame formatted data encoded with said network control code at said transmission bit rate received from said setting means over said DDS-I network.

14. The apparatus of claim 13, wherein said setting means includes means for setting said bit rate to one of 2.4 KBPS, 4.8 KBPS and 9.6 KBPS.

15. The apparatus of claim 13, wherein said control code includes a zero suppression code.

16. A method of transmitting a data stream of DDS-SC frame encoded data over a standard DDS-I network, comprising the steps of:

adjusting the bit rate of said DDS-SC frame encoded data to correspond to the standard bit rate of said DDS-I network;

transmitting said adjusted data over said DDS-I network; and transmitting a bipolar violation encoded zero suppression code over said DDS-I network when said adjusted data includes at least six consecutive binary zeros.

17. A method for transmitting primary and secondary channel data on a standard DDS-I network, the method comprising:

receiving a primary channel data signal;

receiving a secondary channel data signal;

providing a control signal;

multiplexing said primary channel data signal with said control signal and said secondary channel data signal to form a framed data signal;

transmitting said framed data signal to said data network during a first time period; and transmitting a bipolar violation encoded zero suppression code during a second time period, said second time period corresponding to a time when said frame formatted data signal includes at least 6 consecutive binary zeros.

18. A method of receiving DDS-SC frame encoded data over a standard DDS-I network, comprising the steps of:

receiving DDS-SC frame encoded data at a bit rate corresponding to the bit rate of said standard DDS-I network; and decoding bipolar violation encoded signals representing idle channel, zero suppression and out of service.

* * * * *